May 7, 1935.  E. L. KIRKEGAARD  2,000,233
ACCOUNTING MACHINE
Filed Dec. 18, 1931  5 Sheets-Sheet 1
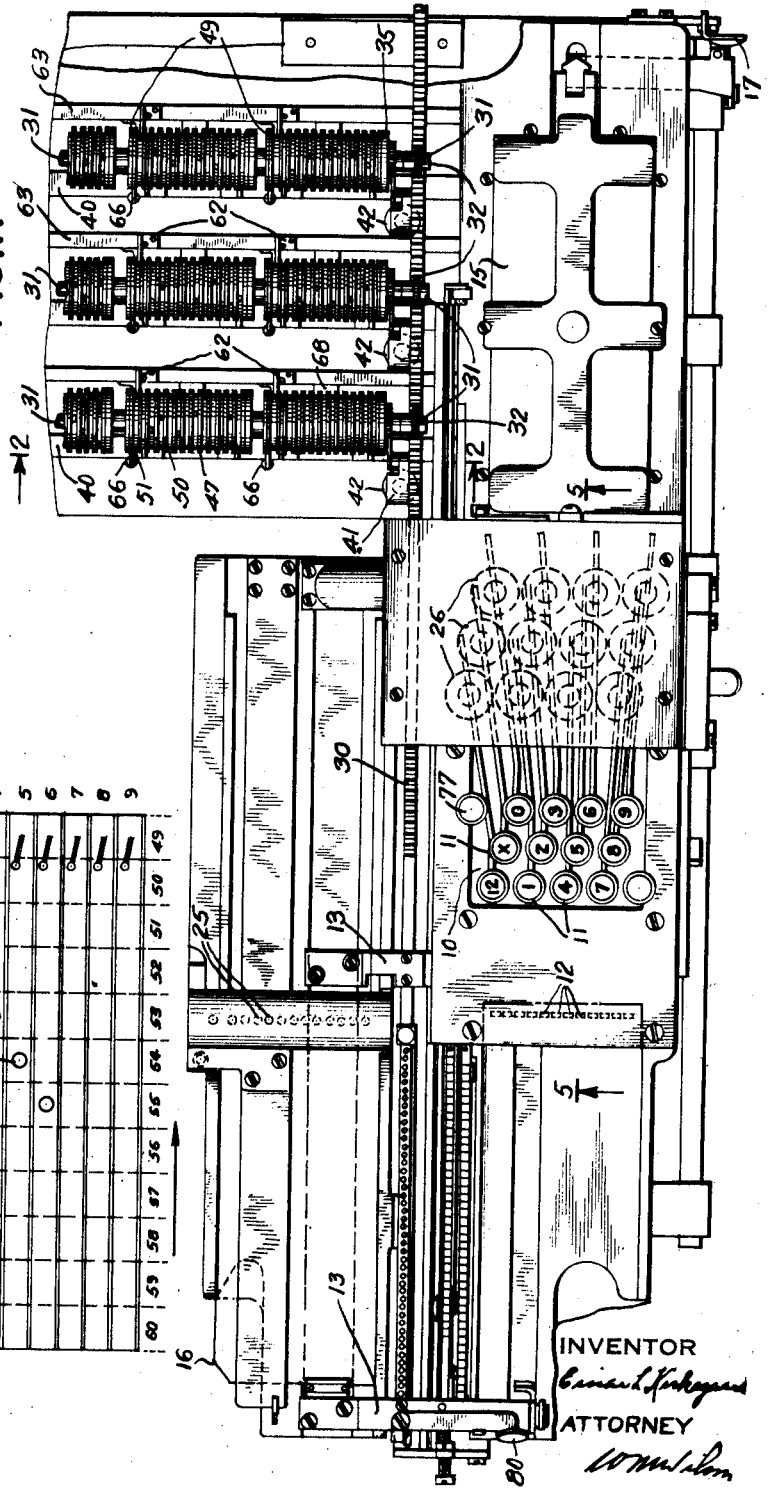
INVENTOR
Einar L. Kirkegaard
ATTORNEY

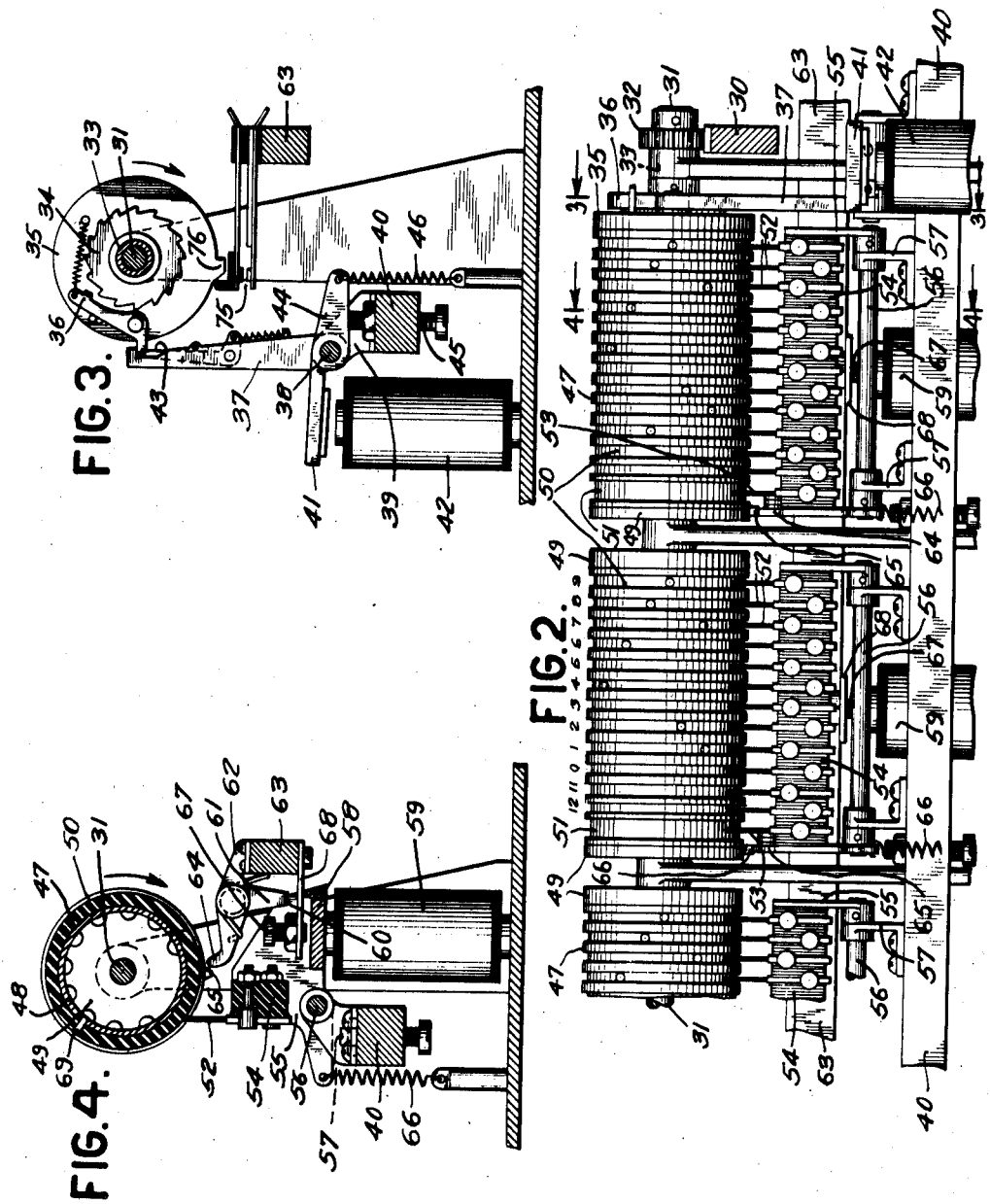

May 7, 1935.  E. L. KIRKEGAARD  2,000,233
ACCOUNTING MACHINE
Filed Dec. 18, 1931   5 Sheets-Sheet 3

INVENTOR
Einar L. Kirkegaard
by

May 7, 1935.  E. L. KIRKEGAARD  2,000,233
ACCOUNTING MACHINE
Filed Dec. 18, 1931   5 Sheets-Sheet 4

INVENTOR
Einar L. Kirkegaard
BY his ATTORNEY

May 7, 1935.　　　E. L. KIRKEGAARD　　　2,000,233
ACCOUNTING MACHINE
Filed Dec. 18, 1931　　　5 Sheets-Sheet 5

INVENTOR
Einard L. Kirkegaard
BY his ATTORNEY

Patented May 7, 1935

2,000,233

UNITED STATES PATENT OFFICE 2,000,233

ACCOUNTING MACHINE

Einar Lawrence Kirkegaard, Detroit, Mich., assignor, by mesne assignments, to International Business Machines Corporation, New York, N. Y., a corporation of New York Application December 18, 1931, Serial No. 581,822

22 Claims. (Cl. 164—113)

This invention relates to accounting machines in general and particularly to a machine for use in a system utilizing perforated records for compiling accounting and statistical data such as, for instance, the well known Hollerith system.

The primary object of the present invention is to provide a novel and distinctive accounting machine which, while it is also capable of performing certain well known kinds of accounting and statistical operations, possesses novel features and functions lacking in heretofore known machines.

One of the broad objects of the invention is to provide a machine which is capable of automatically recording predetermined data on a record medium such as a card whenever certain selective devices function.

The recording operation may be accomplished in any suitable manner as by means of a perforating mechanism operable to produce record cards of the Hollerith type while the selective devices may comprise a series of manually operable keys or other similar devices or such selective devices may comprise a series of selecting elements controlled by devices which read a perforated record used as a master or control record and cause certain predetermined data appearing on the master record to be reproduced in the record produced by the machine. In other words, the machine may operate in one of two ways.

According to one scheme of operation a series of keys on a suitable keyboard may be operated to control the machine in making a record on a suitable record medium of the data set-up on the keys and at the same time the keys select one of certain denominationally grouped auxiliary devices which eventually becomes automatically effective to make a record in the record medium of predetermined data set-up in the selected auxiliary device.

According to another scheme, the machine reads a master or control record and reproduces in the record medium certain data on the master record and at the same time controls selecting devices which determine the selection of one of several denominationally grouped auxiliary devices which selected auxiliary device eventually becomes effective to automatically record predetermined data on the record medium in accordance with the set-up of the selecting devices.

Broadly conceived, the present invention is not limited solely to embodiment in a perforating machine or to use in producing perforated records as it might well be embodied in many other machines used in the accounting and statistical machine arts as, for instance, it might be used to control a typewriting machine or a combined typewriting and accounting machine.

Another broad object is to increase the usefulness of perforating machines used to prepare perforated records for accounting and statistical purposes and, further, to provide for greater flexibility of operation of such machines.

Other objects, advantages, or features of the invention will be pointed out in the following description and claims or will be apparent after a study thereof and of the accompanying drawings.

In the drawings.

Figure 1 is a top plan view illustrating a perforating machine to which the present invention has been applied.

Figure 2 is a vertical section taken on the line 2—2 in Figure 1.

Figure 3 is a vertical section taken on the line 3—3 in Figure 2.

Figure 4 is a vertical section taken in the line 4—4 in Figure 2.

Figure 9 is a developed view of the surface of one of the commutator devices showing the manner in which the data designating pins are set up.

The invention may best be illustrated by describing it with reference to a specific type of machine and its employment in carrying out a certain type of accounting operation, consequently the following description will deal with an illustrative embodiment of the invention suitably adapted to the accounting procedure of a public utility corporation such as an electric light and power company, gas company, or water service company since it is admirably adapted to the accounting systems and practices of such concerns.

Before proceeding with the description of the invention a brief explanation will be given of the cards which are produced by the machine, referring particularly to Fig. 7 which illustrates a card which may be used to control an accounting and statistical machine of the Hollerith type. The card illustrated in Fig. 7 has been arranged for use in the accounting system of a gas and electric company.

It is the practice of gas and electric companies and similar concerns to send meter readers around to the various places where gas or electricity is supplied to customers to take the readings of the meters in order to determine the consumption for the period since the last meter reading was taken. Such meter readers usually record the present reading of the meter upon a suitable form or in a suitable schedule book which is then turned over to the accounting department.

The accounting department compares the present reading of the meters with the past readings and the difference, indicating the consumption for the period under consideration, is used to bill the customer for the service rendered during said period. It is common for public utilities to employ the perforated card system of accounting owing to the great advantages which such card system possesses over manual accounting systems wherein accounting and statistical information is secured by use of adding machines or special bookkeeping machines.

Figures 6, 7:
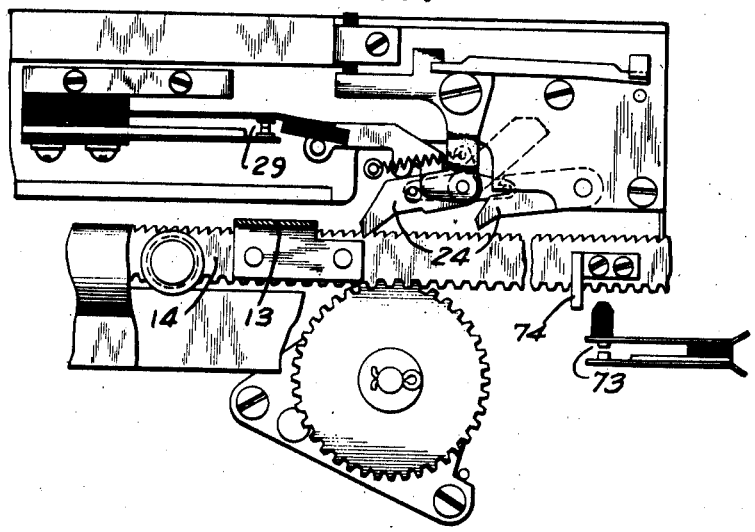
Figure 6 is a rear view in elevation of the card carriage escapement mechanism and certain contacts actuated by the carriage.
Figure 7 illustrates a record card such as may be used with the machine hereinafter described.

Fig. 7 illustrates a typical card which is punched to indicate the meter readings, consumption, and the amount of the bill for an individual customer. It will be noted by reference to said figure that the first group of columns headed "Card No." is perforated in accordance with the number printed at the top of the card. The next columns indicate the dates of the present and previous meter readings. After that comes the group number and the account number and other data which refers to the particular customer which the card represents. Near the middle of the card will be observed columns which are devoted to the present and previous readings of the meter on the right of which columns appear a number of columns devoted to the rate. The next column is devoted to the consumption which is the difference between the amounts punched in the columns representing present and previous readings. Columns 50 to 60, inclusive, represent the amount billed to the customer and are designed to indicate both the gross amount and the net amount.

The last two groups of columns just mentioned, the gross and net columns, refer to the gross amount which is paid when the customer avails himself of the full time in which payment must be made, and the net amount which is the amount after a discount has been deducted and is the amount paid when the customer avails himself of the discount period. The last columns of the card are not in use or may be used for making special written notations which are not ordinarily punched.

When billing the customer it is necessary to determine the difference between the present and previous readings of the meter in order to secure the consumption and then to figure the amount of the bill by multiplying by suitable factors based upon the rate or directly by the rates themselves. Most public utilities rates for service of gas, electricity, or water are based upon some arbitrary sliding scale of rates which makes it to the benefit of a customer to use larger quantities of electricity, for example. Such sliding scales are very common and may be illustrated by the following example:

It will be assumed that the service is residential and for electricity, and that the rate is nine cents per kilowatt hour for the first twenty kilowatt hours, eight cents for the next thirty kilowatt hours, and three cents per kilowatt hour for consumption exceeding fifty kilowatt hours. The foregoing is a very common schedule of rates.

Assuming further, that an individual customer's consumption is found to be sixty-two kilowatt hours for the month, it is necessary, in order to determine the amount to be billed to the customer, to divide up the consumption into a number of parts and figure the rates separately for each part and then to add the totals together to secure the amount of the bill. The computation required to ascertain the amount of the bills is as follows:

20 kwh. at 9¢ per kwh_____ 1.80
30 kwh. at 8¢ per kwh_____ 2.40
12 kwh. at 3¢ per kwh_____  .36
—
62 kwh.
    Gross amount of bill_____ $4.56
Less 10% discount for cash_____  .46

Net amount of bill_____ $4.10

The gross amount of the bill is punched in columns 51 to 55, inclusive, headed "Gross" while the net amount of the bill is punched in columns 56 to 60, inclusive, headed "Net". The columns headed "Consumption Distribution" are provided for the purpose of splitting the consumption according to some desired plan as, for instance, according to whether the electricity consumed is used for heat, light, or power. In the following description it will be assumed that no distribution is made of the consumption and that the latter is to be punched in columns 48, 49, and 50.

It will be observed that the mathematical operations necessary to compute the gross and net amount of the bill include addition, subtraction, and multiplication.

Where a large number of customers must be billed, this is a very tedious and laborious process requiring a great many clerks and considerable over-time, of course, around the time when the bills are being sent out and it frequently results in considerable delay in billing the customers owing to the mass of detail which is required aside from the mere computing of the amount of the bill.

It is proposed according to the present invention to provide a machine having denominationally grouped control devices which is capable of taking care of just such computations whereby the simple procedure of punching the consumption in the card will automatically set in motion one of said devices which will read out the amount of the bill and automatically punch the card with such amount.

The cards may then be gathered together and run through a well known type of tabulating machine such as the Hollerith machine, for example, equipped with a special form feeding attachment which will print the amounts directly on the bills themselves, which forms may be separated and sent immediately to the customer.

With the foregoing preliminary explanation in mind the construction of a machine capable of automatically punching the amount of the bill on the customer's individual record card will now be described.

This invention, for sake of convenience in description, will be described in connection with a perforating machine of the type illustrated in Letters Patent 1,772,186 granted August 5, 1930 to Lee and Phillips, however, it will be understood that it is not limited in its application to the particular machine illustrated and described as it may be incorporated in other machines equally as well or even in different types of machines.

Figure 5:
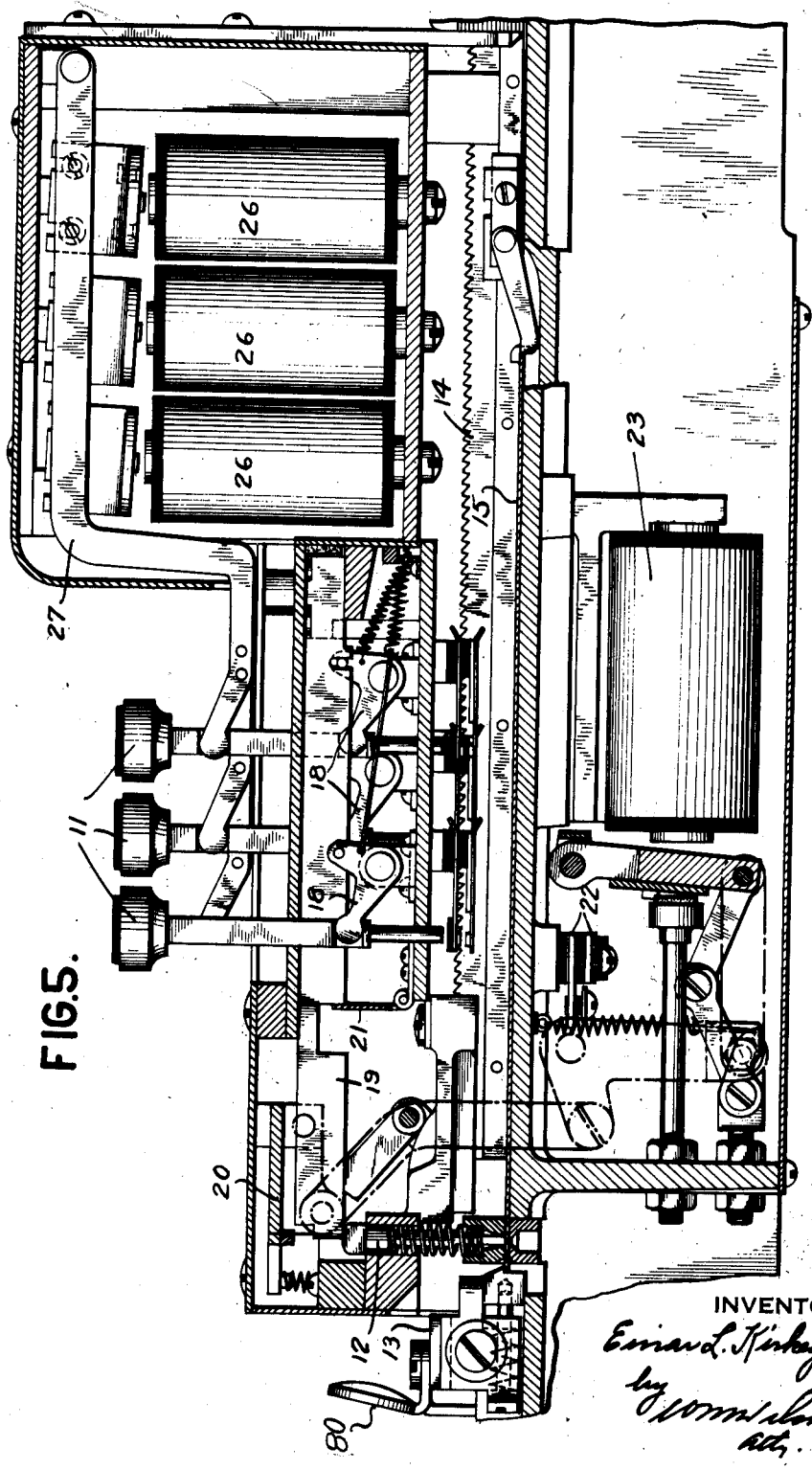
Figure 5 is a vertical section taken on the line 5—5 in Figure 1.

Figs. 1, 5 and 6 illustrate the general construction of a punching machine like that shown in the above patent, wherein the numeral 10 indicates a suitable key board having keys 11 for selectively controlling the operation of a series of punches 12. The latter are arranged to perforate a card held between the arms 13 of a card carriage 14 which is arranged to receive a blank card 15 from a suitable magazine and feed the card step by step towards the left (Figs. 1 and 5) during which step-by-step movement the perforations are made in each column in a well known manner. There is also provided mechanism for reading a similar card 16 having perforations like those in the card in Fig. 7 which perforations selectively control the punches 12 to punch a blank card 14.

When it is desired to control the punches 12 manually, the keys 11 are operated in the desired succession after having first grasped a thumb lever 17 at the right of the machine (Fig. 1) and moved it to the left (Fig. 1) which operation feeds a blank card 15 from the magazine and causes it to come between the arms 13. The operation of the lever 17 also causes the carriage 14 to move to the right from the position shown in Fig. 1 to receive the blank card 15 fed from the magazine. Thereafter, when the appropriate keys 11 are operated, the punches 12 perforate the card successively as the carriage 14 moves to the left under the influence of a suitable escapement mechanism operated under control of the keys.

The keys 11 are vertically movable in a pair of horizontal plates in spaced relation and each is arranged to cooperate with a bell crank 18, which, when the associated key 11 is depressed, moves an interposer 19 to the left (Fig. 5) so that the left end of said interposer comes between the upper end of the corresponding punch 12 and a rib carried by a depressible plate 20 pivotally mounted in the framework. At the same time, movement of the interposer 19 to the left (Fig. 5) rocks a plate 21 which effects closure of a pair of contacts 22 which cause energization of the punch operating magnet 23. The punch operating magnet 23 then attracts its armature and through a linkage draws down plate 20 thereby forcing the selected punch 12 through the blank card. At the same time mechanism described in the patent herein referred to becomes effective to control a pair of escapement dogs 24 which, after the punching of the card has been effected, causes the carriage to advance one column space in readiness for producing the next perforation.

It is sometimes desired to effect the punching operations under control of perforations in the separate card 16, called a master card, which is placed in the machine between rearward extensions of the arms 13 as indicated in Fig. 1. When the lever 17 is operated to feed a blank card 15 from the magazine the carriage 14, of course, moves to the right (Fig. 1) carrying with it the master card 16 so that when the blank card 15 fed from the magazine is in position to have its first column punched a series of reading devices 25 will be in position to read the perforations in the first column of the master card 16.

The reading of the master card 15 and the selective operation of the punches 12 is effected under control of the reading devices 25 through the medium of a series of magnets 26 associated with the key board 10, each magnet being particularly associated with a certain key of the key board and arranged when energized to depress such key through a rockable lever 27 having a pivotal connection to the stem of the appropriate key. When the reading devices 25 sense a perforation in one of the index point positions of any column of the master card 15, the appropriate magnet 26 will be energized and will effect depression of the key corresponding to the index point position in which the perforation occurs and thus will control the corresponding punch 12 for that index point. The reading devices 25 may comprise a series of ball contacts, as illustrated in the patent referred to above, and cooperate with a suitable contact roll 28, not shown in Fig. 1, but illustrated diagrammatically in Fig. 8.

In order to prevent reenergization of any of magnets 26 before the carriage has fully escaped after a perforation has been made there is provided a pair of contacts 29 which are in series with all of said magnets. The contacts 29 are operated by one of the dogs 24 when the latter are operated to effect escaping of the carriage and the timing of said contacts is such that they do not re-close until the carriage has practically come to rest after escaping one column space.

The contacts 29 are normally closed but are opened when one of the dogs 24 is raised upon the energization of the magnet 23. The operation of these contacts is fully described in application Serial No. 391,874, filed September 11, 1929, by Fred Lee and Geo. F. Daly.

The mechanism for automatically punching the gross and net amounts of the bill will now be described in detail with reference particularly to Figs. 1 to 4 and 8. The carriage 14 has secured thereto a rack 30 which extends to the right (Fig. 1) and is adapted to drive a series of shafts 31 extending transversely of said rack through the medium of pinions 32 loosely mounted on said shafts. In the illustrative embodiment of the invention it will be understood that there are ten shafts 31 although only three such shafts are illustrated in Fig. 1. Each shaft 31 is adapted to be driven by the rack 30 whenever a suitable clutch associated with each shaft is selectively operated.

Each clutch includes a sleeve 33 to which a pinion 32 is secured, and a ratchet 34 also secured to the sleeve 33. Cooperating with the ratchet 34 is a disk 35 fixed to the shaft 31 and carrying a spring operated driving pawl 36 having a nose adapted to be drawn between the teeth in the ratchet 34 so that when said ratchet is rotated in a clockwise direction (Fig. 3) the disk 35 will also be driven in a clockwise direction and will rotate certain commutator devices carried by the shaft 31.

Normally the pawl 36 is held out of cooperative relation with the ratchet 34 by means of detent 37 secured to a short shaft 38 journalled in a bracket 39. The bracket 39 is mounted upon a cross bar 40 supported by the framework and extending parallel with the shaft 31. Also secured to the shaft 38 is an arm 41 having an armature cooperating with a magnet 42 mounted upon the framework of the machine. The detent 37 also carries a latch 43 the purpose of which is to prevent back-lash of the pawl 36 when arrested by the detent 37. The armature 41 has a rightwardly extending arm 44 which is normally held down against the end of an adjusting screw 45 by means of a spring 46 secured to said arm and to a fixed part of the frame.

Whenever a magnet 42 is energized its armature will be attracted and rock the arm 41 counterclockwise as viewed in Fig. 3 thereby withdrawing the detent 37 from engagement with the tail of the driving pawl 36 permitting the spring attached to said pawl to draw the nose of the pawl into engagement with the teeth in the ratchet 34 thus coupling the shaft 31 to the pinion 32 so that subsequent movement of the carriage to the left will cause the shaft 31 to turn in a clockwise direction (Fig. 3). The purpose of the clutch mechanism just described is to provide for selecting any one of the ten shafts for operation to eventually effect automatic punching of the gross and net amounts in the card.

Mounted upon each shaft 31 is a denominational group of ten commutator devices illustrated in detail in Figs. 2 and 4. Each commutator device consists of a drum 47 which surrounds and is concentric with a conducting tube 48 and is rigidly mounted on disks 49 secured to the shaft 31. The ends of those drums 47 nearest the rack 30 are partly supported by the clutch disks 35.

Each drum 47 is provided with thirteen circumferential grooves 50, 51 in spaced relation, the grooves 50 corresponding to the twelve index point positions in a card column while the thirteenth groove 51 is designed to carry a common contact ring 51 which has a connection to the tube 48. Cooperating with grooves 50, 51 in each drum 47 are brushes 52, 53, the brush 53 being adapted to bear on the common contact ring 51, and all are carried by a bar 54 of insulating material secured to a pair of plates 55 rigidly mounted on a short shaft 56, the latter being journalled in brackets 57 mounted in the bar 40.

Extending between each pair of plates 55 and connecting the latter in spaced relation is the armature 58 of an electromagnet 59 supported by the framework.

One of the plates 55 is provided with a locking notch 60 with which cooperates one end of a bell crank 61 pivotally mounted upon a bracket 62 secured to a bar 63 extending parallel with the shaft 31. The bell crank 61 is normally spring-urged in a clockwise direction (Fig. 4) and is provided with a nose 64 normally in the path of a projection 65 formed in one of the end rings 49 of the commutator device.

Normally a spring 66 attached to one of the plates 55 holds the armature 58 up against a stop 67 carried by an arm 68 secured to bar 63. When a magnet 59 is energized the associated armature 58 will be attracted and will rock the plates 55, shaft and bar 54 as a unit clockwise (Fig. 4) until the end of bell crank 61 snaps into the notch 60 in one of the plates 55 to hold the frame including the latter in rocked position as shown in Fig. 4 in which position the brushes 53 will bear on the surface of the commutator device.

Each of the commutator devices carried by the shafts 31 is designed to be set up according to predetermined data so that such commutator devices may be called into action selectively to control the punches 12 automatically in accordance with the data set up. In order to understand the manner in which the data is set up on the commutator devices reference may be made to Fig. 9 and for this purpose it may be imagined that the entire surface of each drum 47 is divided by a series of imaginary lines extending axially of the drum and circumferentially spaced equal distances apart as indicated by the broken lines in Fig. 9 so as to divide the surface of the drum into twelve axially extending strips each of which will be understood to correspond to one of the columns in the record card.

The drums illustrated in Figs. 2 and 4 have arbitrarily been designed to have an automatic punching capacity of ten columns, that is to say, it will be possible to set up data on the surface of such drum, as will be hereinafter described, that will control punching in a field of ten columns of the record card produced by the machine, that is, columns 51 to 60, inclusive, grouped under the heading "Amount" (Fig. 7).

In order to set up the predetermined data on the commutator small pins 69 are pressed through suitable holes in both the drum 47 and the tube 48 (Fig. 4) so that the ends of said pins project far enough to be sensed by the brushes 52 which brushes 52 bear in the grooves 50, 51 in the surface of the drum 47 as said drum revolves after having first energized magnet 59 to couple shaft 31 to the rack 30 in a manner presently to be described.

As was remarked before, each of the grooves 50 in the drums 47 corresponds to one of the index point positions, consequently it is possible to set up on the drum 47 numerical data. This is accomplished by setting a pin 69 in the drum in the groove corresponding to the desired index point position and the proper distance circumferentially of the drum to position to cause it to be sensed by a brush 52 when the drum 47 has been turned the proper distance by the rack. To illustrate this we will assume that the machine is to be used to automatically punch the gross and net amount of a bill for electricity wherein the consumption and rates are as set forth in the illustrative example hereinbefore in which it was assumed that the current consumption was sixty-two kilowatt hours.

It will be noted by reference to the illustrative example that the gross amount of the bill is $4.56 while the net amount is $4.10. Accordingly therefore, a pin 69 will be set in the groove under the numeral "4" (Fig. 2) a distance about the drum sufficient to cause said pin to be read by a brush 52 when the card carriage is positioned to bring the punches into register with the column in which the "4" is to be punched. Other similar pins 69 will be set in the grooves corresponding to the numerals "5" and "6" and distances sufficient to cause said pins to be read by brushes 52 at the respective points in the movement of carriage 14 where the punches will perforate the appropriate column of the record card. After the amount $4.56 has been set up in this manner, two pins are positioned in grooves corresponding to the numeral "0" to provide for spacing the carriage over the two unused columns in the group of columns devoted to the net amount of the bill and then pins will be positioned for the amount $4.10 in the same manner as just described. It will, of course, be necessary to set pins in the groove 50 corresponding to the numeral "0" for the two unused columns in the field devoted to the gross amount of the bill as otherwise the machine would not space automatically.

It will be noted by reference to Figs. 4 and 9 that the brushes 52, 53 normally are opposite the portion of the commutator device assigned to the 49th column, that is, the column assigned to be punched with the digit "0" of the consumption. When the first digit of the consumption is punched either manually or automatically the commutator device will be rotated as hereinafter described one-twelfth of a revolution and will come opposite the portion of the commutator assigned to the 50th column.

When the second digit of the consumption, that is the "2" is punched, the brushes will be moved into contact with the surface of the drum of the commutator device. Thereafter the rack 30 will move the commutator device another twelfth of a revolution so that one of the brushes 52 will sense a pin 69 in the portion of the drum assigned to the fifty-first column. This will cause an impulse to be transmitted to the magnet 26 associated with the "0" punch, causing the latter to be actuated to punch a hole in the "0" index point position of the card and thereafter the carriage will escape causing the drum 47 to turn a further increment of one-twelfth of a revolution. Since a pin 69 also appears in the portion of the drum corresponding to the "0" index point position of the 52nd column, the process will be repeated and another "0" punched in the card. The rack will then turn the drum 47 a further increment and the brushes will sense the pin 69 corresponding with the "4" index point position so that a "4" will be punched in the fifty-third column of the card. This process will be repeated until the drum has made a complete revolution and will result in punching the values "$4.56" and "$4.10" in the gross and net columns respectively. The manner in which the commutator devices are selectively operated will be more clearly explained hereinafter.

It will be understood hereinafter that there will be ten shafts 31 on each of which shafts will be mounted a denominational group of ten commutator devices like those shown in Fig. 2. There will thus be one hundred commutator devices in the illustrative embodiment of the machine, each of these commutator devices having assigned thereto one of the numbers ranging from "00" to "99".

In order to select any one of these commutator devices for operation it is necessary to first select the appropriate one of the clutches connecting the desired shaft to the rack 30 and thereafter energize one of the magnets 59 which will result in both coupling the desired commutator device to the rack 30 and in raising the brushes 52, 53 associated with said device into contact with the surface of the drum. Thereafter, as the carriage spaces in response to successive punching operations, the drum selected will be rotated and will eventually control the transmitting successive impulses to the desired punch selecting magnets 26 to cause the latter to automatically perforate in a blank card the data which has been set up on the selected commutator device.

The desired commutator device which is to control automatic punching may be selected either by the operation of one of the keys 11 on the key board 10 or may be controlled through the reading devices 25 and a suitable master card 16, according to the will of the operator. For simplicity it will be assumed that the selection is to be accomplished by depression of the keys on the key board 10.

Figure 8:
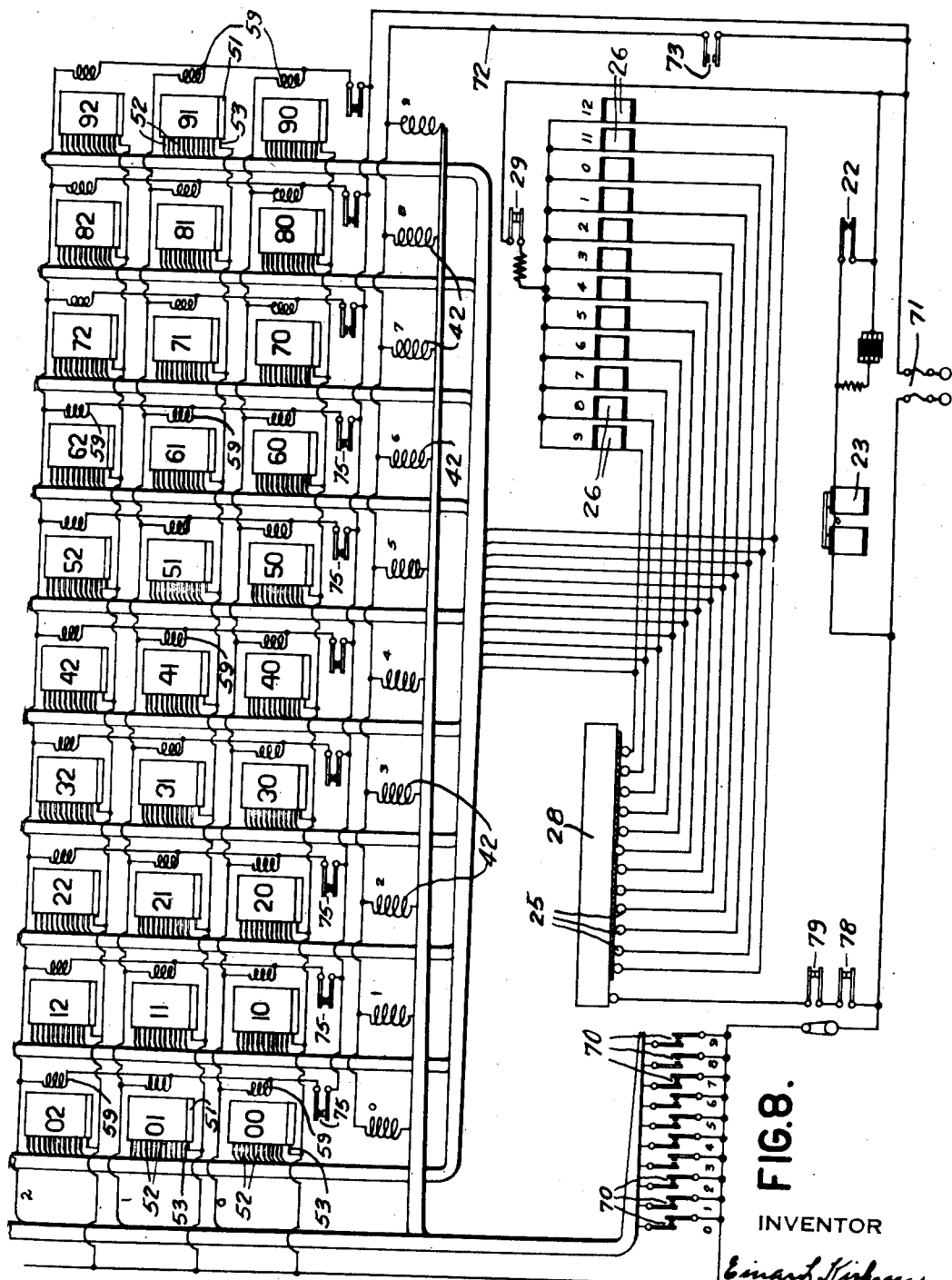
Figure 8 is a circuit diagram showing the electrical connections of the machine.

Each of the keys 11 has associated therewith a pair of contacts 70 which are arranged to be closed whenever said key is depressed (Figs. 5 and 8). These contacts 70 have a common connection through a suitable switch to one side of the current supply line 71 (Fig. 8) and each individually has a common connection to a particular one of the magnets 59 on each shaft 31. The contacts 70 associated with the "0" key, for instance, are connected to the magnets 59 of all the commutator devices mounted on the ends of the shafts 31 nearest the rack 30 which are indicated diagrammatically by the lowest horizontal row of commutator devices shown in Fig. 8.

Similarly, the contacts 70 controlled by the "2" key have a common connection to all of the magnets 59 associated with the commutator devices which are third from the rack 30, that is, the top row in Fig. 8. Correspondingly, each of the remaining pairs of contacts 70 is associated with a horizontal row of commutator devices similar to the rows in Fig. 8 and carried by shafts 31. Each pair of contacts 70 is also connected to some one of the magnets 42 which operate the clutches connecting the rack 30 to the shafts 31. Thus the contacts 70 operated by the "0" key are connected to one end of the winding of magnet 42 associated with the first shaft 31 on the left (Fig. 1) or the first magnet 42 on the left in Fig. 8, while the contacts 70 associated with the "1" key are connected to the magnet associated with the second shaft from the left or the second magnet from the left in Fig. 8. It will be understood that the commutator devices in Figs. 1 and 8 are laid out in the same relative positions.

Each of the magnets 42 is connected to a common wire 72 through a pair of contacts 73 to one side of the line 71. The contacts 73 are operated by a projection 74 fixed to the side of the carriage 14 which projection 74 is positioned to close the contacts 73 when the carriage 14 moves to column 49 (Fig. 7), that is, the first digit of consumption is about to be punched in the first of the last two columns of the third group under the heading "Consumption".

All the magnets 59 associated with each shaft 31 have a common connection to a pair of contacts 75 which are operated by a cam projection 76 formed in the disk 35 associated with that shaft, the cam projection 76 being so positioned that it takes one-twelfth of a revolution of the disk 35 to close the contacts 75 which event will occur when the punches are in position to punch the units portion of the consumption in the last column of the field devoted to the consumption. The contacts 75 are all connected in common to one side of the line 71.

Each of the brushes 52 corresponding to a particular index point position is connected to a common wire which is connected to the wire joining the reading device 25 and magnet 26 associated with that index point position. The brushes 52 corresponding to the "4" index point position, for example, are connected in common to the wire joining reading device 25 which is assigned to the "4" index point position in the master card and the magnet 26 which controls the operation of the "4" punch 12.

Each of the commutator devices illustrated in the drawings is set up in accordance with the computation of the gross and net amounts of the bill for one of the values of consumption ranging from 0 kilowatt hours to 99 kilowatt hours, disregarding fractions of a kilowatt hour. For instance, the lowest horizontal row of commutator devices in Fig. 8 is designed to read out and automatically control the punching of the gross and net amounts of the bill for the successive values of 00 kilowatt hours, 10, 20, 30, etc., kilowatt hours by increments of ten kilowatt hours. The next horizontal row above is designed to read out the amount of the bill for the values 1, 11, 21, 31, 41, etc., kilowatt hours, likewise by increments of ten and so on for the other horizontal rows. In other words, each shaft 31 carries commutator devices for reading the amount of the bill for ten increments of consumption, the first shaft on the left (Figs. 1 and 8) being devoted to the increments from 00 to 09 kilowatt hours, while the second shaft from the left is designed to read the increments from 10 to 19 kilowatt hours and so on for the other shafts.

The scale of rates for service in most common use by public utilities includes a minimum charge in "service charge", as it is called and most frequently it amounts to one dollar. All values of consumption up to and including 10 kilowatt hours, in the illustrative example would be disregarded and the customer would be billed one dollar both gross and net. Accordingly, the commutator devices on the first shaft from the left and the two next to the rack 30 on the second shaft from the left may be set up to read out and punch one dollar in both the gross and net columns.

The operation of the machine will now be described taking for the purpose of illustrating the mode of operation of the machine, the example hereinbefore mentioned in which the consumption was assumed to be sixty-two kilowatt hours. The operator either by means of a suitable master card 16 or by successive actuation of keys 11 will enter the data appearing in the first forty-eight columns of the record card which will cause a blank card to be punched in the manner described and the carriage 14 then escapes one column to bring the punches over the 19th column of the card. This will cause the contacts 73 to be closed by the projection 74 mounted on the carriage 14 thereby connecting the wire 72 to the line 71. The operator next depresses the "6" key representing the tens portion of the amount "62". This operation will cause the contacts 70 associated with the sixth key to close and energize the clutch magnet 42 associated with the seventh shaft from the left (Fig. 1), or the seventh magnet 42 from the left (Fig. 8) thereby causing the machine to punch the value "6" in the 49th column of the record card and at the same time the clutch associated with said seventh shaft is operated so that when the carriage escapes, the seventh shaft 31 will be coupled to the rack and will be turned one twelfth of a revolution thereby closing the contacts 75 and breaking the contacts 73. No circuits can be established other than the circuit to the punch magnet 23 through the closure of contacts 22 since the contacts 75 do not close until the carriage escapes.

After the foregoing cycle of operations the "2" key is depressed by the operator thereby establishing a circuit from the left side of the line 71, through the contacts 70 associated with the "2" key, through the magnet 59 associated with the commutator device bearing the numeral "62" (Fig. 8), through contacts 75 associated with the seventh shaft, now closed, to the other side of the line 71. This causes the brushes 52, 53 associated with the commutator device indicated "62" in Fig. 8 of the drawings to be raised into contact with drum 47 and thereafter the carriage will escape and turn the shaft 31 another twelfth of a revolution. Since there is a pin in the groove corresponding to the "0" index point position on this commutator device according to the setup previously described, a circuit will be established from the left side of line 72, through the common ring 51 and brush 53 associated with the commutator device indicated "62" in Fig. 8, the brush 52 corresponding to the "0" groove 50 of said commutator device, and the pin 69 aforementioned, through the common wire to the "0" magnet 26. This will cause the "0" punch to be operated and effect eventual escaping of the carriage a further column space which, of course, will bring the second "0" pin 69 under brush 52 of the commutator device indicated "62". The operation of punching a "0" will be repeated which will cause the carriage to again escape and rotate the commutator device indicated "62" a further increment causing the pins 69 representing $4 to be brought under the brush 52 associated with groove 50 corresponding to the "4" index point position. This will cause an impulse to be transmitted through the magnet 26 corresponding to the "4" punch thereby effecting a perforation in the "4" index point position of the card.

The remaining digits of the amount $4.56 will be likewise punched in this manner after which two zeros will be automatically punched and thereafter the amount $4.10 will be punched automatically and the machine will stop.

The usual release key 77 may then be depressed which will effect release of the carriage causing it to move the remaining distance toward the left after which a new master card 16 may be placed in the machine and the right hand feed lever 17 operated to feed a new blank card into position to be punched. When the lever 17 is operated the contacts 78 (Fig. 8) are opened to prevent the brushes from reading the perforations in the master card while the carriage is moving said master card to the right in readiness for a punching operation.

There is also provided a similar pair of contacts 79 opened whenever a feed lever 80 mounted on one of the arms 13 of the carriage is operated. The feed lever 80 is used when it is desired to place a blank card in the machine manually rather than to feed it from the magazine carrying the cards 15. The feed levers 17 and 80 and the contacts 78, 79 are fully described in the patent referred to hereinbefore and, as they are in the nature of safety contacts common to punches of the type illustrated and described in said patent, they need not be described in detail herein but reference may be had to the patent for a more complete description of the operation.

It may be desired at times to make the operation fully automatic in the sense that the operator is not required to manipulate any keys in the entering of amounts. In order to accomplish this result it is merely necessary to place a card which has already been punched in the desired columns in position to be read by the reading devices. This card, indicated by the reference numeral 16 in Fig. 1 of the drawings, will automatically effect punching of the desired data when the feed lever 17 is operated to feed a blank card into position for punching and then released.

Operation of the feed lever 17 brings the first column of the card 16 under the reading devices 25 and also brings the first column of the blank card under the punches 12 so that when the lever 17 is released the reading devices 25 immediately become effective to sense perforations in the card 16 the punches 12 will be selectively operated through the medium of the magnets 26 to cause a substantial duplicate of the card 16 to be reproduced. When the point is reached where the contacts 73 close any further data punched in those columns which control the selection of one of the commutator devices for operation will set in motion said commutator device and thereafter automatic punching will be effected in the desired fields and under control of the selected commutator device.

It will be understood that the master card 16 will need to be blank and unpunched in the fields corresponding to those in the blank card 15 in which automatic punching is effected. After the fields in which automatic punching is to be effected have been perforated, further perforations in the remaining columns of the master card may cause the machine to automatically punch the remainder of the blank card with any desired data which may appear in the master card, or, if desired, the remaining data may be punched manually under control of the key board.

It will be seen from the foregoing description that the construction herein described provides a very flexible machine which is readily adaptable to many lines of work wherein it is desired to automatically punch predetermined data in the cards as the machine may be made either fully automatic or may be partially automatic and partially manual in its operation.

In the illustrative embodiment shown and described the operator of the machine might have before him the previous month's file of customers' cards and certain data appearing on the previous month's cards may be automatically entered in a new card and the data which is different from the previous month's data such as the new reading of the meter and the consumption may be entered manually by means of the keyboard 10 and, after the consumption has been punched or described, one of the commutator devices will be called into action automatically and will punch the amount of the bill without requiring any further control by the operator.

The operation of billing customers and figuring the amounts of their bills may be very speedily accomplished by the mechanism as the commutator devices can be set up to take care of any possible bill within the range of the number of commutator devices. In the illustrative embodiment any value of consumption from 1 kilowatt hour to 99 kilowatt hours may be automatically evaluated and punched in the card without the necessity of using adding machines or multiplying machines or other auxiliary machines for determining the amount of the bill.

If desired, the commutator devices may be set up to automatically punch in the card not only such data as the gross and net amount of the bill but other data such as fixed charges or special charges, due dates, or other information, all according to the desire of the user of the machine.

The machine is not limited in its use to the accounting operation selected as an example as it may be used for performing any accounting operation where it is necessary to punch data in the cards according to predetermined schedules of rates or values.

It should be observed also that the invention is not limited in its scope to embodiment in a punching machine as obviously it might be incorporated in a typewriting machine, for example, the commutator devices controlling the typewriter keys instead of the punch keys and the punches. In case of embodiment in a typewriting machine, of course, the commutator devices might be driven by a suitable rack connected to the typewriter carriage in which case the amounts would be printed on a record sheet instead of punched in a record card.

While the machine has been illustrated and described as embodied in a specific form and in a particular type of machine, it is not desired to be limited to the embodiment herein shown and described as it is capable of adaptation in different machines and in different forms according to the conditions found in practice.

I claim:—

1. In a machine for producing accounting and statistical record sheets, perforating mechanism, a series of keys for directly controlling the perforating mechanism to record data; a plurality of auxiliary data retaining devices, each of said devices being a self-contained independent unit and adapted to be set up to represent pre-determined data which are to be ultimately automatically recorded each time such unit is selected for operation and which data bears a predetermined relation to data punched under direct control of the keys, each of said units being adapted when arbitrarily selected by the operator to automatically control the perforating mechanism in accordance with the data set up on the selected device; and selecting mechanism controlled by the keys and adapted when one or more keys are operated to arbitrarily select only one of the data retaining devices for automatic operation of the perforating mechanism.

2. In a record controlled machine, perforating mechanism controlled by data designations in a control record and including punch selecting devices controlled in accordance with said data designations, and a plurality of data retaining devices selectively called into operation by the selecting devices to subsequently automatically control the latter in accordance with pre-determined data set-up in the selected data retaining device.

3. In a record controlled machine, perforating mechanism, means for selectively operating the perforating mechanism, and a plurality of auxiliary control devices selectively called into action by the first named means to control the perforating mechanism in accordance with pre-determined data set-up in the selected auxiliary control device.

4. In a machine for producing perforated accounting and statistical record sheets, a series of punches, means for selecting the punches for a data punching operation; a plurality of self-contained auxiliary operating units, each unit being adapted to be set up to represent pre-determined data which are to be recorded automatically in subsequent machine operations every time such unit is selected for operation and which data bear a definite relation to data punched under control of the selecting means, each unit being adapted to be arbitrarily selectively coupled to the punches to thereafter automatically selectively control said punches in accordance with the data set up on such unit; and means controlled by operation of the selecting means for arbitrarily selectively coupling one of said units to the punches for an automatic punching operation.

5. In combination, punching mechanism including a card carriage and a series of punches, said card carriage and punches being movable relative to each other in a direction transverse of the punches to perforate the card in accordance with desired data, selective means for operating said punches, a plurality of data retaining devices adapted to be operated through the relative movement between the card carriage and punches to control the latter in accordance with data set up on said devices and means controlled 6. In combination, a perforating mechanism including a series of punches for perforating said record, a carriage for a blank record and movable relative to the punches, and a series of keys for selectively operating the punches; means for automatically controlling the punches in accordance with predetermined data comprising a plurality of devices adapted to be selectively connected to the carriage for operation by the latter to control said punches, and means controlled by the keys for selectively connecting one of said devices to the card carriage for operation by the latter.

7. An automatic control device for perforating machines having punches and selective devices for directly controlling the punches, comprising a plurality of control devices for said punches, each control device being adapted to be set up in accordance with predetermined data, operating means therefor, and means controlled by the selective devices for selectively connecting one of said control devices to the operating means and punches to actuate the latter in accordance with the data set up on said control device.

8. In combination with perforating mechanism including a carriage for a blank record, punches, and selecting devices, said carriage being movable relative to the punches in response to successive operation of the latter; a plurality of control devices for actuating the punches successively in accordance with predetermined set-ups in said control devices, a rack driven by the carriage, and means controlled by the selecting devices for connecting one of said control devices to the rack for operation by the latter to successively operate the punches in accordance with the set-up of the selected control device.

9. In combination with perforating mechanism including a carriage for a blank record, punches, and selecting devices, said carriage being movable relative to the punches in response to successive operation of the latter; a plurality of control devices for actuating the punches successively in accordance with predetermined set-ups in said control devices, a rack driven by the carriage, and means controlled by the selecting devices for connecting one of said control devices to the rack for operation by the latter to successively operate the punches in accordance with the set-up of the selected control device, said last named means comprising a plurality of denominational shafts each supporting a denominational group of control devices, a clutch for each shaft controlled by one of the selecting devices and operable to connect said shaft to the rack for operation by the latter, and means also controlled by the selecting devices for rendering effective one of the control devices on the shaft selected by operation of a clutch.

10. In a control unit for a perforating machine having selecting devices and punches controlled by the selecting devices, the combination with said selecting devices of a plurality of denominationally grouped commutator devices selectable by said selecting devices to control the punches automatically in accordance with predetermined set-ups, a series of pins positionable on each commutator device in accordance with the desired set-up, reading mechanism for the pins set-up on each commutator device, operating mechanism common to all of said commutator devices, and means for selectively connecting one of said devices to the operating mechanism comprising means controlled by the selecting devices for first selectively connecting a denominational group of commutator devices as a whole to the operating mechanism and thereafter rendering effective the reading mechanism of one of the commutator devices in the selected group to automatically control the punches in accordance with the pins set-up on the selected commutator device.

11. In combination, recording mechanism, a plurality of rotatable control cylinders; each cylinder being a self-contained independent unit having means for setting up such cylinder to represent data which is to be repeatedly recorded during subsequent machine operations, said means being adapted to control the recording mechanism in accordance with the data set-up on said cylinder when the latter is rotated, means for rotating said cylinders and a plurality of selecting devices operable singly or in combination for selectively coupling one of said cylinders to the rotating means.

12. An accounting machine having recording mechanism and selecting devices for actuating the recording mechanism to record items, a plurality of item retaining devices, each being adapted to be set up in accordance with predetermined data and identified by a number assigned to said device, said devices being arranged in denominational groups in accordance with their identification numbers, and denominational selecting means adapted to be set up in accordance with the identifying numbers for establishing a control connection between one of said retaining devices and the selecting devices in accordance with a number set up on the denominational selecting means.

13. An accounting machine comprising recording elements and selectively actuable means for individually directly operating the recording elements to record data on a blank sheet, and a machine control device for automatically selectively actuating said selectively actuable means in accordance with predetermined data set up on said device and having selecting mechanism controlled by the selectively actuable means for rendering a part only of said control device effective to subsequently actuate the selectively actuable means in accordance with further data set up on said device and bearing a definite predetermined relation to the first named data.

14. In combination, recording mechanism including numeral keys, operating devices adapted to operate said keys individually to record data, a control device adapted to control the operating devices in accordance with data designations in the control device, and means controlled by the operation of one or more numeral keys for selecting for operation a portion of the control device to control the operating devices in accordance with data designations in the portion of the control device selected for operation.

15. In combination, recording mechanism, magnets for controlling said mechanism to record items, a plurality of commutator devices each adapted to be set up in accordance with predetermined data, control circuits to said magnets and common to said devices, selecting circuits, and means controlled by the selecting circuits for connecting one of said devices to the control circuits to control said magnets in accordance with the set up of the selected commutator device.

16. In combination, recording mechanism, a plurality of commutator devices adapted to control the recording mechanism in accordance with predetermined data set up on the commutator device, a master record, and means controlled by the master record for calling into action one of said commutator devices to control the recording mechanism in accordance with the set up of the selected commutator device.

17. An accounting machine comprising recording mechanism having recording elements, a recording station, a carriage for a blank record, said recording station and carriage being movable step-by-step relative to each other at each operation of a recording element to space the data recorded, and keys for controlling said elements to record data; a plurality of data retaining devices, each adapted to control a plurality of the recording elements and adapted to be set up in accordance with predetermined data, and means controlled by the operation of one or more of said keys for selecting one of said devices for operation to control the recording elements in accordance with the data set up on the selected device.

18. An accounting machine comprising recording mechanism and a series of keys for directly controlling the recording mechanism to enter preliminary data on a record blank, data retaining devices each adapted to control recording operations of the recording mechanism, each of said devices being a self-contained unit adapted to be set up in accordance with data bearing a definite relationship to data entered on the blank record under direct control of the keys, and means controlled by operation of one or more of the keys in entering data for calling into action one of said devices to subsequently automatically control the recording mechanism in accordance with data related to the data entered under direct control of the keys.

19. In an accounting machine, recording mechanism, a single set of selecting devices for directly controlling operation of the recording elements and operable both singly and in combination to record an item or factor; a series of machine control devices, each being a self-contained independent unit adapted to be initially set up in accordance with data which is to be repeatedly recorded during subsequent operations of the machine, the data set-up on each unit having a pre-arranged relation to the factors or items recorded, each unit being also adapted to automatically operate the recording mechanism in accordance with data set up on such unit whenever the latter is selected for operation; and selecting mechanism effective upon an operation of one or more of the selecting devices to connect to the recording mechanism the unit corresponding to the factor or item recorded in response to control by the selecting mechanism.

20. In a record controlled machine, recording mechanism, means for selectively operating the recording mechanism to record a factor or item, and a plurality of auxiliary machine control devices selectively called into operation by an operation of the first named means to control the recording mechanism in accordance with predetermined data set up on the selected device and bearing a pre-determined relation to a factor or item recorded by operation of the first-named means.

21. In combination, recording mechanism including a support for a blank record, recording elements, and selecting devices for controlling recording operations of said elements, said carriage and elements being movable relative to each other in response to successive operation of the other in response to successive operation of the latter; a plurality of auxiliary control units, each unit being adapted to control the recording elements successively in accordance with a predetermined set-up; an operating element for said units and operated in response to relative movement between the support and recording elements; and means controlled by operation of one or more of the selecting devices for connecting one of said units to the operating element for operation by the latter whereby to successively operate the recording elements in accordance with the set-up of the selected unit.

22. An accounting machine comprising recording mechanism, selecting elements operable both singly or in combinations for controlling the operation of the recording mechanism to record items; a plurality of machine control units greater in number than the selecting elements, each control unit having means for designating data according to a prearranged schedule or schedules whereby each unit when operated is adapted to control the recording mechanism to reproduce the data designated by said unit, the data designated remaining unchanged throughout a plurality of machine operations until changed in accordance with a new schedule or schedules; means for operating a selected unit, and means effective on an operation of one or a combination of the selecting elements to select one of the units for operation by the operating means whereby to record the data designated by the selected unit.

EINAR LAWRENCE KIRKEGAARD.